US012533389B2

(12) United States Patent
Seyedsayamdost et al.

(10) Patent No.: US 12,533,389 B2
(45) Date of Patent: Jan. 27, 2026

(54) GLYCOPEPTIDE ANTIBIOTIC COMBINATION THERAPY

(71) Applicant: The Trustees of Princeton University, Princeton, NJ (US)

(72) Inventors: Mohammad R. Seyedsayamdost, Princeton, NJ (US); Vasiliki T. Chioti, Plainsboro, NJ (US); Katherine M. Davis, Decatur, GA (US); Kirklin L. McWhorter, Decatur, GA (US)

(73) Assignees: THE TRUSTEES OF PRINCETON UNIVERSITY, Princeton, NJ (US); EMORY UNIVERSITY, Atlanta, GA (US)

( * ) Notice: Subject to any disclaimer, the term of this patent is extended or adjusted under 35 U.S.C. 154(b) by 0 days.

(21) Appl. No.: 17/873,269

(22) Filed: Jul. 26, 2022

(65) Prior Publication Data

US 2023/0044467 A1 Feb. 9, 2023

Related U.S. Application Data

(60) Provisional application No. 63/225,607, filed on Jul. 26, 2021.

(51) Int. Cl.
*A61K 38/14* (2006.01)
*A61P 31/04* (2006.01)
*C07K 9/00* (2006.01)

(52) U.S. Cl.
CPC .............. *A61K 38/14* (2013.01); *A61P 31/04* (2018.01); *C07K 9/008* (2013.01)

(58) Field of Classification Search
CPC .......... A61K 38/14; A61P 31/04; C07K 9/008
See application file for complete search history.

(56) References Cited

U.S. PATENT DOCUMENTS 10,434,124 B2 * 10/2019 Jones ................. A61K 31/7048

OTHER PUBLICATIONS

Xu et al (Nature Chemical Biology, vol. 15, Feb. 2019, 161-168) (Year: 2019).*
Ahmed et al (Indian Journal of Critical Care Medicine, May 2014, vol. 18, Issue 5, 56-60) (Year: 2014).*
Bartlett (CID, 2008, 46, 1489-1492). (Year: 2008).*
Chioti et al, ChemRxiv, May 25, 2021, version 1 (Year: 2021).*
Tallarida [Genes & Cancer, 2011, vol. 2, No. 11, 1003-1008] (Year: 2011).*
Culp, E.J. et al., "Evolution-guided discovery of antibiotics that inhibit peptidoglycan remodelling", Nature (2020), p. 582, vol. 578.
Gerhard, U. et al., "The Role of the Sugar and Chlorine Substituents in the Dimerization of Vancomycin Antiobiotics", J. Am. Chem. Soc. (1993), 232-237, 115(1).
Mackay, J.P. et al., "Dissections of the Contributions toward Dimerization of Glycopeptide Antibiotics", J. Am. Chem. Soc. (1994), 4573-4580, vol. 116.
Booth, P.M. and Williams, D.H., "Preparation and Conformational Analysis of Vancomycin Hexapeptide and Aglucovancomycin Hexapeptide", J. Chem. Soc. Perkin Trans. I (1989), 2335-2339.

* cited by examiner

*Primary Examiner* — Sudhakar Katakam
(74) *Attorney, Agent, or Firm* — Meagher Emanuel Laks Goldberg & Liao, LLP

(57) ABSTRACT

Bacterial infections evading the current antibiotic arsenal warrant new treatment options. The mainstay treatment for *Clostridium difficile* infections involves administration of the broad-spectrum antibiotic vancomycin, which also depletes the gut microbiome and its natural defenses. This leads to recurrent *C. difficile* infections in 20-30% of patients. Alternative treatment options are limited, triggering a perpetual cycle of relapse and recovery that may eventually lead to death. Keratinicyclin B represents a glycopeptide antibiotic chemotype with a mechanism of action that is selective for Clostridia. When combined, vancomycin (or other glycopeptide antibiotic) and keratinicyclin B interact synergistically to inhibit the growth of *C. difficile* at concentrations far lower than their respective minimal inhibitory concentrations. Such a combination therapy could allow for targeted colonization clearance at low antibiotic doses, thereby minimizing toxicity and reducing the likelihood of relapse.

8 Claims, 5 Drawing Sheets diacetyl-L-Lys-D-Ala-D-Ala

Possible O-O repulsion diacetyl-L-Lys-D-Ala-D-Ala

GLYCOPEPTIDE ANTIBIOTIC COMBINATION THERAPY

CROSS-REFERENCE TO RELATED APPLICATIONS

This application claims priority to U.S. Provisional Patent Application 63/225,607, filed on Jul. 26, 2021, the entirety of which is incorporated by reference herein.

STATEMENT REGARDING FEDERALLY SPONSORED RESEARCH OR DEVELOPMENT

This invention was made with government support under Grant Nos. GM129496 and GM129460 awarded by the National Institutes of Health. The government has certain rights in the invention.

TECHNICAL FIELD

This application is drawn to treatments for infections utilizing a combination of molecules, and specifically, treatments of *Clostridium difficile* infections using a combination of glycopeptide antibiotics.

BACKGROUND

*Clostridium difficile* is an opportunistic pathogen that can cause symptoms ranging from diarrhea to life-threatening colon inflammation. According to the Centers for Disease Control and Prevention, *C. difficile* is a public health threat that requires urgent action.

It is known that gut microbiota have the capability of providing colonization resistance against *C. difficile*. However, current approaches to treatment generally involve the use of broad spectrum antibiotics, which disrupt the gut microbiota, leading to the loss of colonization resistance, thereby increasing the risk of recurrence of such an infection.

A method of treatment that can more specifically target *C. difficile* with less risk of damaging gut microbiota is therefore desirable.

BRIEF SUMMARY

The present disclosure is drawn to a method for treating or preventing an infection caused by *C. difficile* via a combination of glycopeptide antibiotics, and specifically where each glycopeptide antibiotic is present at a concentration below its minimal inhibitory concentration, but synergistically works to treat or prevent the infection.

In some embodiments, a pharmaceutical composition for treating or preventing an infection caused by *C. difficile* may be provided. The pharmaceutical composition may include a plurality of glycopeptide antibiotics and a pharmaceutically acceptable carrier. The plurality of glycopeptide antibiotics includes a first glycopeptide antibiotic comprising keratinicyclin B or a derivative thereof. Each of the plurality of glycopeptide antibiotics is present in a concentration less than its respective minimal inhibitory concentration of *C. difficile*.

In some embodiments, the plurality of glycopeptide antibiotics includes a second glycopeptide antibiotic, where the second glycopeptide antibiotic may be vancomycin, telavancin, dalbavancin, oritavancin, teicoplanin, a keratinicyclin different from keratinicyclin B, or a combination thereof. In some embodiments, the concentrations of each glycopeptide antibiotic may be between 1/2 and 1/20 of its respective minimal inhibitory concentration, and may be between 1/4 and 1/8 of its respective minimal inhibitory concentration. In some embodiments, the concentration of each glycopeptide antibiotic may be between 150 nM and 350 nM. In some embodiments, the concentration of keratinicyclin B may be between 250 nM and 350 nM, and the concentration of a second glycopeptide antibiotic may be between 150 nM and 250 nM.

In some embodiments, a method for treating or preventing a *C. difficile* infection may be provided. The method may include administering a therapeutically effective dose of a first glycopeptide antibiotic and a second glycopeptide antibiotic, the first and second glycopeptide antibiotic being provided in concentrations less than their respective minimal inhibitory concentrations, and allowing the first glycopeptide antibiotic and second glycopeptide antibiotic to specifically inhibit *C. difficile* in a synergistic manner. The first glycopeptide antibiotic may selectively inhibits a plurality of *Clostridium* species including *C. difficile*, while the second glycopeptide antibiotic may be a broad-spectrum inhibitor of a plurality of species, including at least one species native to a human microbiome.

In some embodiments, the first glycopeptide antibiotic may be a keratinicyclin or derivative thereof, such as keratinicyclin B or a derivative thereof. In some embodiments, the at least one species native to a human microbiome comprises at least one species native to a human gut microbiome. In some embodiments, the second glycopeptide antibiotic may be vancomycin, telavancin, dalbavancin, oritavancin, teicoplanin, a keratinicyclin different from keratinicyclin B, or a combination thereof. In some embodiments, the concentrations of each glycopeptide antibiotic may be between 1/2 and 1/20 of its respective minimal inhibitory concentration, and may be between 1/4 and 1/8 of its respective minimal inhibitory concentration. In some embodiments, the therapeutically effective dose of the plurality of glycopeptide antibiotics may be administered orally.

DETAILED DESCRIPTION

Glycopeptide antibiotics (GPAs) have been indispensable in the fight against infectious disease, including *C. difficile* infections. To date, over a hundred members have been characterized giving rise to at least five different structural classes. However, use of GPAs has drawbacks—to avoid creating GPA-resistant strains of bacteria, higher doses are utilized to ensure the infections are eliminated, but higher doses can be more problematic for patients, as broad-spectrum GPAs also disrupt beneficial bacteria of the patient's microbiome. This may result in recurrences, or the need for additional treatments to recover from the GPA treatment.

Treatment of C. difficile infection with either metronidazole or vancomycin results in disease recurrence in 20-30% of cases. In hope of addressing the high relapse rate, fidaxomicin was approved by the FDA in 2011 for the treatment of C. difficile infection. Compared to metronidazole and vancomycin, fidaxomicin displays a narrower spectrum of antibacterial activity, which mitigates gut dysbiosis and halves recurrence rates. However, further improvements in clinical outcomes are necessary.

In some embodiments, a pharmaceutical composition may be provided that overcomes these issues that face conventional GPA treatment options.

The pharmaceutical composition may include a plurality of glycopeptide antibiotics, including a first glycopeptide antibiotic and a second glycopeptide antibiotic. Each glycopeptide antibiotic is preferably present at a concentration below its minimal inhibitory concentration.

Figure 1:
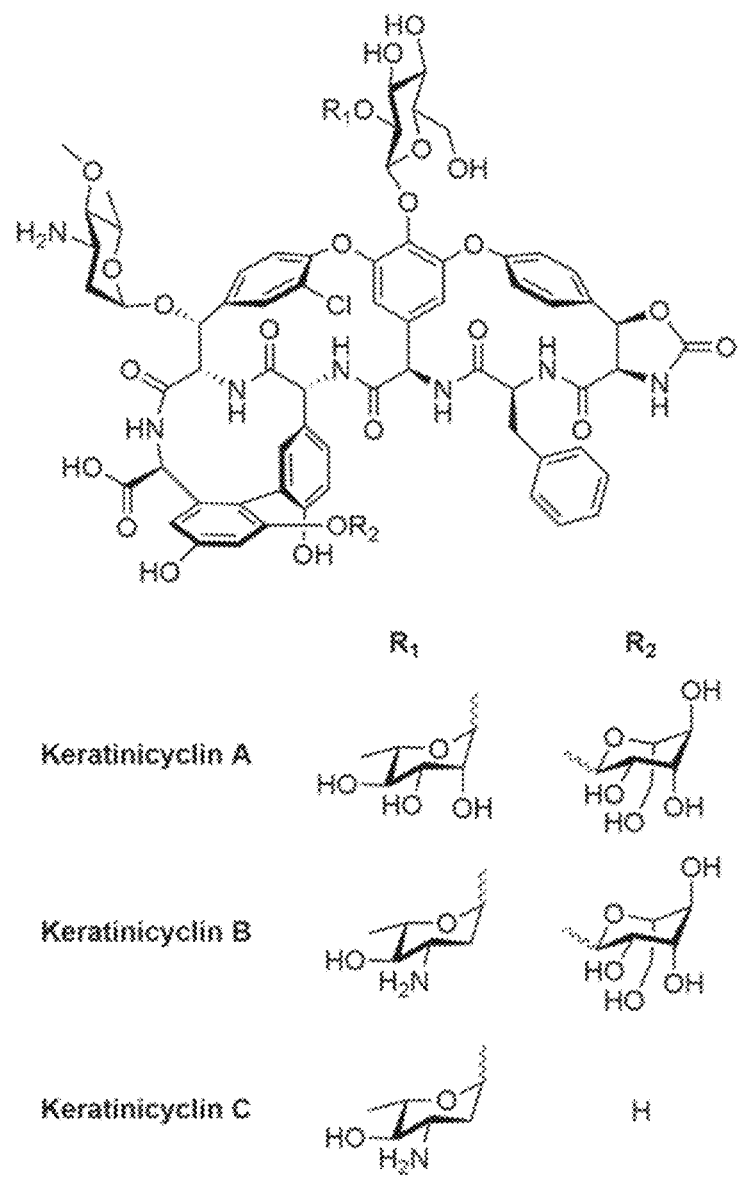
FIG. 1 is an image showing the structures of keratinicyclin A, B, and C.

In some embodiments, the first glycopeptide antibiotic may selectively inhibits a plurality of Clostridium species including C. difficile. In some embodiments, the first glycopeptide antibiotic is Keratinicyclin B. See FIG. 1.

It is envisioned that the second glycopeptide antibiotic may be any known glycopeptide antibiotic that has some ability to inhibit C. difficile. In some embodiments, the second glycopeptide is an inhibitor of a plurality of species, including C. difficile and at least one species native to a human microbiome (such as a skin microbiome or a gut microbiome).

Figure 2A:
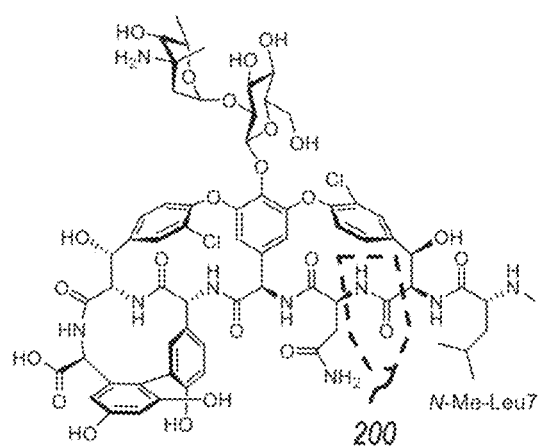
FIG. 2A is an image showing the structure of vancomycin.
Figure 2B:
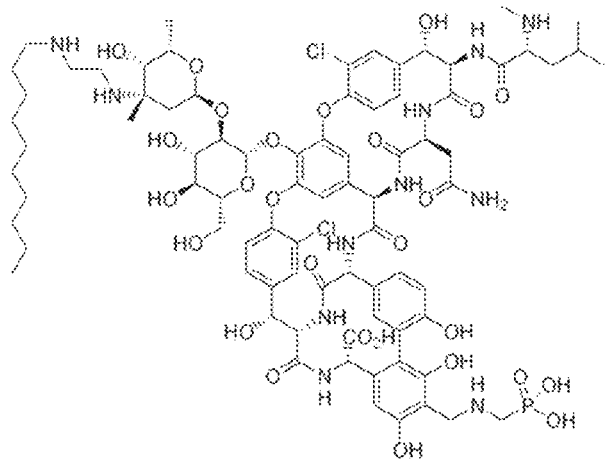
FIG. 2B is an image showing the structure of telavancin.

In some preferred embodiments, the second glycopeptide antibiotic may be a clinically available glycopeptide, such as vancomycin (FIG. 2A), teicoplanin, a lipoglycopeptide antibiotic (such as telavancin (FIG. 2B), dalbavancin, or oritavancin), or a combination thereof.

Figure 2C:
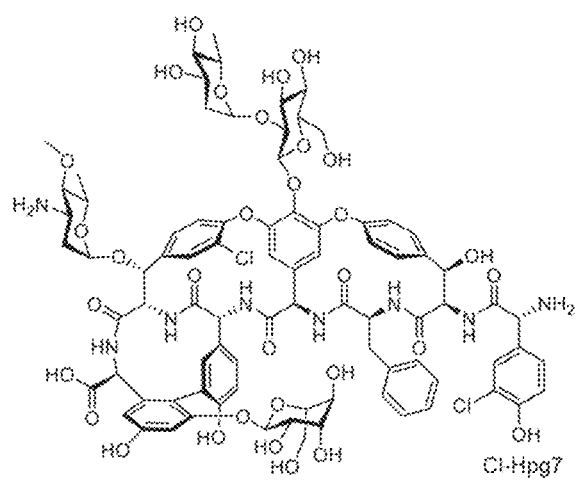
FIG. 2C is an image showing the structure of keratinimicin A.

In some embodiments, the second glycopeptide antibiotic may be a keratinimicin such as keratinimicin A, B, C, and/or D. Keratinimicin A (FIG. 2C) is a class II GPA that exhibits broad-spectrum activity against diverse Gram-positive bacteria. Keratinimicin C (FIG. 2D) is a natural derivative of Keratinimicin A in which the N-terminal amine is replaced with a ketone, thereby removing the positive charge at this position.

In some embodiments, the second glycopeptide antibiotic may be a keratinicyclin that is different from keratinicyclin B. In some embodiments, the keratinicyclin may be keratinicyclin A and/or C (see FIG. 1).

Keratinicyclins, form a new chemotype within the GPAs, distinct from vancomycin, owing to the presence of an unusual N-terminal oxazolidinone. Keratinicyclin B (see FIG. 1) harbors antiviral properties and only specific antimicrobial activity against C. difficile. While the structures of keratinicyclins and keratinimicins had previously been identified, absolute configurations of stereogenic centers had only been inferred, not experimentally determined, and the lack of broad antibacterial activity for keratinicyclin, despite containing all H-bonding components to bind D-Ala-D-Ala, remained unexplained.

To explore whether lack of peptidoglycan binding by keratinicyclin B explains its narrow-spectrum antimicrobial phenotype, equilibrium binding studies were carried out using isothermal titration calorimetry (ITC).

ITC titrations were performed at 25° C. using a MicroCal PEAQ-ITC calorimeter (Malvern Panalytical, UK). Glycopeptide and $Ac_2$-KAA solutions were prepared in 0.1 M sodium phosphate buffer, pH 7. Glycopeptide concentrations were determined using absorbance measurements at 280 nm with extinction coefficients $\varepsilon_{280}$=6,000 $M^{-1}$ $cm^{-1}$ for vancomycin and keratinicyclin B, and $\varepsilon_{280}$=7,500 $M^{-1}$ $cm^{-1}$ for keratinimicins A and C. Prior to titration, all samples were degassed (25° C., 10 min) and centrifuged (12,000 g, 25° C., 5 min) to avoid signal artifacts due to air bubbles and aggregation, respectively. Each experiment involved sequential addition of $Ac_2$-KAA ligand (19 consecutive injections of 2 µL of ligand at 200-225 µM with a 150-s delay between injections) into sample cell charged with glycopeptide (10 µM, 200 µL). The concentration of the glycopeptide was kept below $10^{-4}$ M to prevent dimerization. The reference power and syringe stirring speed were set to 10 µcal/s and 600 rpm, respectively. The heat pulses (µcal/s) generated upon binding were recorded as a function of time. The first data point was deleted prior to data processing due to ligand diffusion from the syringe tip during the equilibration period. The area under each injection peak was integrated and normalized for concentration to generate a titration curve that was fitted using the MicroCal PEAQ-ITC Analysis Software (see FIGS. 3A-3D). The stoichiometry (N), Gibbs free energy (ΔG), enthalpy (ΔH), entropy (ΔS) and dissociation constant ($K_d$) were extracted using the standard one-site binding model.

Figure 3A:
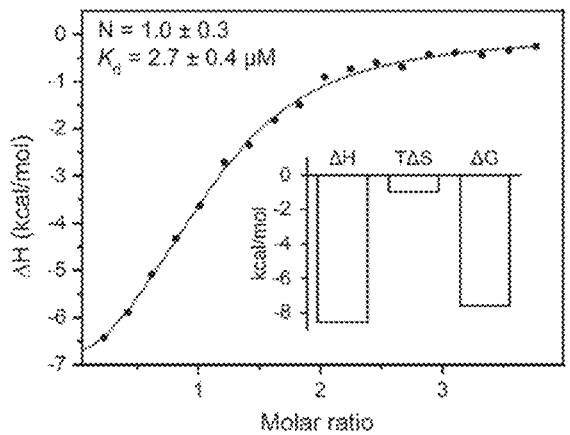
FIGS. 3A-3D are graphs of ITC-derived binding isotherms of GPAs to the tripeptide ligand for vancomycin (3A), keratinimicin A (3B), keratinicyclin B (3C), and keratinimicin C (3D). Complex stoichiometry (N), $K_d$, $\Delta H$, $T\Delta S$, and $\Delta G$ for the interaction are given in each plot.
Figure 3B:
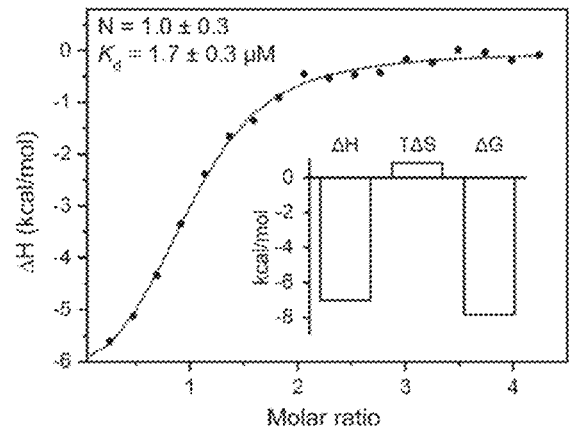
Figure 3C:
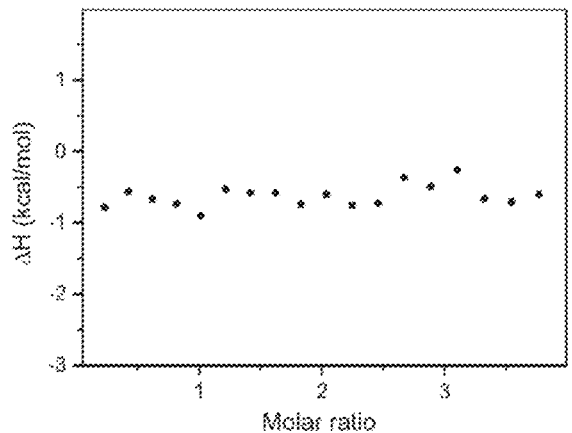
Figure 3D:
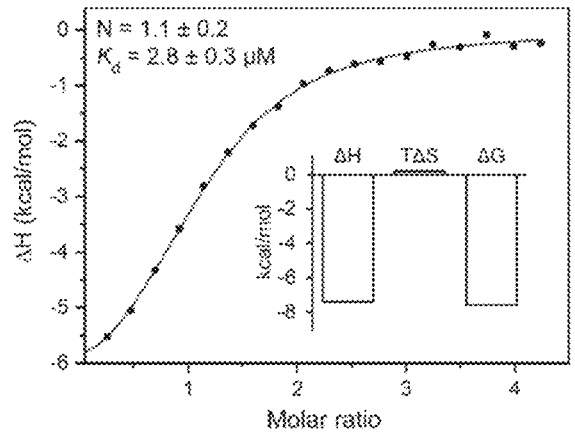

As control, binding of vancomycin to the Nα,Nε-diacetyl-L-Lys-D-Ala-D-Ala tripeptide—the terminal three residues of a typical Gram-positive peptidoglycan—was tested, and formation of a 1:1 complex with a $K_d$ of 2.7±0.4 µM as well as ΔH and TΔS of −8.6±0.5 kcal/mol and −0.96 kcal/mol, was observed respectively (FIG. 3A). Both the affinity and entropic penalty for binding the tripeptide are consistent with previous results for vancomycin. Ligand binding induces back-to-back dimerization of vancomycin via intermolecular H-bonds. However, cooperativity was not probed under the ITC conditions, as the operating concentrations were below the equilibrium constant for dimerization. With keratinimicin A, formation of a 1:1 complex was also observed, this time with a $K_d$ of 1.7±0.3 ΔH of 7.0±0.3 kcal/mol and TΔS of 0.85 kcal/mol (FIG. 3B). Thus, while ΔG for the interaction is similar between vancomycin and keratinimicin A, binding by keratinimicin A is both enthalpically and entropically driven. It is suspected that the entropic gain with keratinimicin A stems from increased solvent disorder upon ligand binding as keratinimicin is significantly more hydrophobic than vancomycin. Keratinicyclin B, on the other hand, did not bind the tripeptide at several concentrations tested despite the presence of the five canonical H-bonding moieties (FIG. 3C). Based on the sensitivity of the setup, a Kd>0.5 mM was estimated.

Extensive studies by others have defined the molecular basis for interaction between vancomycin and its target. Collectively, they suggest three hypotheses that may explain why keratinicyclin B does not bind the tripeptide:

First, the charged N-terminal ammonium group of vancomycin is known to be important for ligand binding, accounting for 1.5-2 kcal/mol of the interaction. In contrast to keratinimicin A, which contains a charged amino terminus at neutral pH, the oxazolidinone of keratinicyclin B is uncharged.

Second, it has been shown that the 6mer version of vancomycin, in which the N-terminal N-Me-D-Leu has been removed by Edman degradation, does not bind the tripeptide ligand. This has been attributed to disruption of the position of the residue 6 amide 200 in vancomycin (see FIG. 2A), which flips out of the binding pocket thereby precluding or weakening the interaction with the tripeptide.

Third, it has been demonstrated that the binding pocket for the peptide ligand is rigid and small; 6 sterics are therefore important for the interaction, a conclusion that has been verified by structural studies of the vancomycin-tripeptide complex.

Figure 2D:
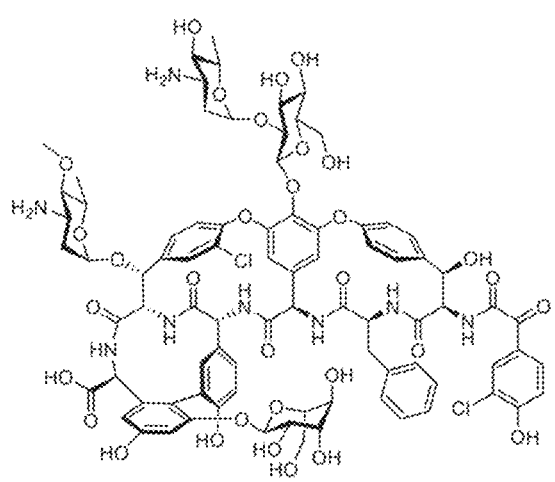
FIG. 2D is an image showing the structure of keratinimicin C.

To test the first hypothesis, keratinimicin C was utilized, where, as noted previously, the N-terminal amine is replaced with a ketone, thereby removing the positive charge at this position. ITC binding studies with keratinimicin C yielded a Kd of 2.8±0.3 µM as well as ΔH and TΔS of −7.4±0.3 kcal/mol and 0.2 kcal/mol, respectively, similar parameters as keratinimicin A (FIG. 2D). This result is consistent with the analogous bioactivity profiles of keratinimicin A and C. Thus, the lack of positive charge at the oxazolidinone of keratinimicin C does not explain its inability to bind the target peptide.

To test the second hypothesis, the topology of the two GPAs was explored by determining structures of 2 and 3 using X-ray crystallography. Repeated attempts to crystallize both compounds via small molecule crystallization methods failed. However, using vapor diffusion techniques typically employed for proteins, crystals of keratinimicin A and keratinicyclin B were generated for X-ray diffraction analysis.

Stock solutions of keratinimicin A and keratinicyclin B were prepared by dissolving lyophilized material in 20 mM HEPES, pH 7.0 to concentrations between 15-20 mg/mL. The resultant solution of keratinimicin A was mixed in a 1:1 ratio with a precipitant solution containing 0.1 M Na acetate (pH 4.5), 2 M Na formate, and 10 mM L-proline, while solution of keratinicyclin B was mixed in a 3:1 ratio with 0.1 M Na acetate (pH 4.6) and 2 M Na formate alone. Drops were allowed to come to equilibrium with a 50 µL reservoir of precipitant solution in a sitting-well vapor-diffusion experiment. Crystals appeared within 24 h and grew to a maximum size over the following week. Upon looping, the crystals were soaked in a cryo-protectant generated by adding 25-30% (v/v) ethylene glycol to the reservoir solution before flash freezing in liquid nitrogen.

Their structures were subsequently solved to 0.9 Å (2) and 0.95 Å (3) resolution (Table 51), thus providing information regarding the backbone conformation and the absolute configuration at chiral centers (FIG. 3).

Diffraction data for keratinimicin A and keratinicyclin B were collected at beamline 23-ID-B of the Advanced Photon Source at Argonne National Laboratory on a Dectris Eiger-16M. Crystals were maintained at 100 K to minimize X-ray-induced damage, and images were collected sequentially (Δφ=0.2°) at incident wavelengths of 0.619921 Å and 0.652523 Å, respectively. All data were indexed, integrated and scaled using XDS software followed by merging with AIMLESS. Experimental phases were determined for keratinimicin A using SHELXD. The structure of keratinicyclin B was then solved via molecular replacement with PHASER using the structure of keratinimicin A as the initial search model. Model building and refinement were performed using Coot and phenix.refine (1.17-3644), respectively. Isotropic B-factors were refined for solvent waters, while anisotropic B-factors were refined for the main molecule, for which hydrogens were added.

The obtained solution belongs to the $P2_12_12_1$ space group and contains two molecules in the asymmetric unit. Final models of keratinimicin A and keratinicyclin B (PDB accession codes: 7LKC & 7LTB) were both refined at 0.95 Å resolution. Selected data processing and refinement statistics are presented in Table 1, below.

TABLE 1

Crystallographic data processing and refinement statistics.

| PDB ID | Keratinimicin A 7LKC | Keratinicyclin B 7LTB |
|---|---|---|
| Data Collection[a] | | |
| Space group | $P2_12_12_1$ | $P2_12_12_1$ |
| Unit cell (Å, °) | a = 20.72, b = 32.25, c = 37.94 $\alpha = \gamma = \beta = 90$ | a = 24.32, b = 29.67, c = 32.21 $\alpha = \gamma = \beta = 90$ |
| Wavelength (Å) | 0.61992 | 0.65252 |
| Resolution range (Å) | 20.7-0.90 (0.92-0.90) | 32.2-0.89 (0.90-0.89) |
| Total observations | 157929 (5903) | 216032 (4279) |
| Total unique observations | 19493 (920) | 18474 (787) |
| I/$\sigma_I$ | 15.0 (0.9) | 12.1 (0.8) |
| Completeness (%) | 99.9 (45.7) | 99.1 (85.9) |
| $R_{meas}$ | 0.055 (1.835) | 0.076 (1.582) |
| $R_{pim}$ | 0.019 (0.712) | 0.022 (0.667) |
| $CC_{1/2}$ | 0.999 (0.983) | 0.991 (0.859) |
| Redundancy | 6.1 (6.4) | 11.7 (5.4) |
| Refinement | | |
| Resolution range[a] (Å) | 19.-0.95 (0.98-0.95) | 22.-0.95 (1.01-0.95) |
| Reflections, total[a] | 16340 (2562) | 15216 (2358) |
| Reflections, test[a] | 806 (133) | 820 (144) |
| Total atoms | 495 | 445 |
| Solvent atoms | 54 | 41 |
| $R_{work}$ ($R_{free}$) | 0.154 (0.168) | 0.146 (0.151) |
| R.M.S. deviations from ideality Bond lengths (Å)/ angles (°) | 0.011/1.85 | 0.013/2.48 |

[a]Values in parentheses refer to the high-resolution shell.

The crystal structure of keratinimicin A reveals a typical cup-shaped topology, the backbone configuration of which aligns well with the structure of vancomycin (PDB accession 1FVM, chain A rmsd of 0.36 Å over 28 atoms). Intriguingly, formate and chloride ions derived from the crystallization condition were observed, occupying similar sites as the terminal carboxyl group and an amide of the tripeptide, when compared to the complexed vancomycin crystal structure, supportive of an analogous binding mode. The structure of keratinimicin A confirms the absolute configuration proposed based on NMR and bioinformatic analyses of the ker gene cluster. Crystallographic data obtained for keratinicyclin B likewise verify the absolute configuration proposed in the original structural studies. They further reveal the oxazolidinone in near perpendicular arrangement with respect to the plane created by the central aryl-ether-crosslinked aro-matic sidechains. Alignment of keratinimicin A and keratinicyclin B shows that their backbone conformations are almost identical with rmsds between 0.14-0.25 Å over 24 atoms when comparing equivalent chains. Indeed, the position of the H-bonding partners that are important in binding the tripeptide are entirely homologous, and the central amide of residue 6 is not flipped away from the binding site. It thus seems unlikely that the second hypothesis explains the disparate tripeptide binding properties of keratinimicin A and keratinicyclin B.

Figure 4A:
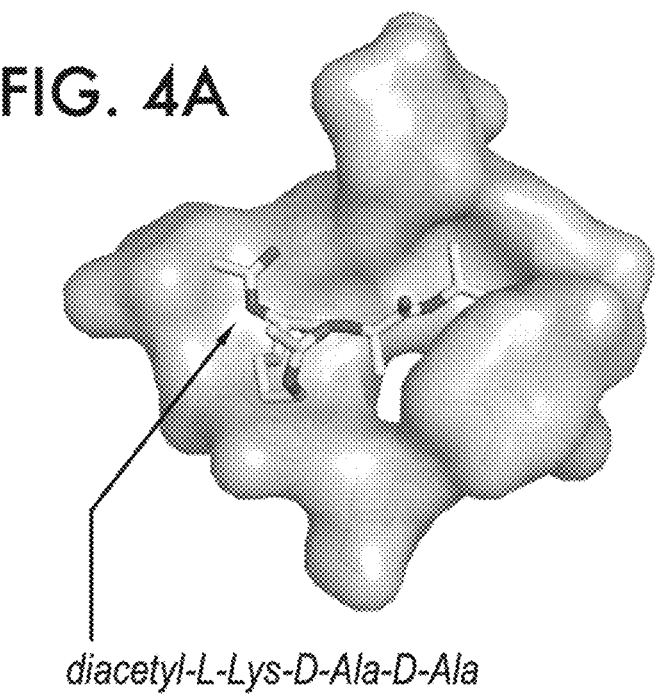
FIGS. 4A and 4B are images of space-filling models for keratinimicin A (4A) and keratinicyclin B (4B).
Figure 4B:
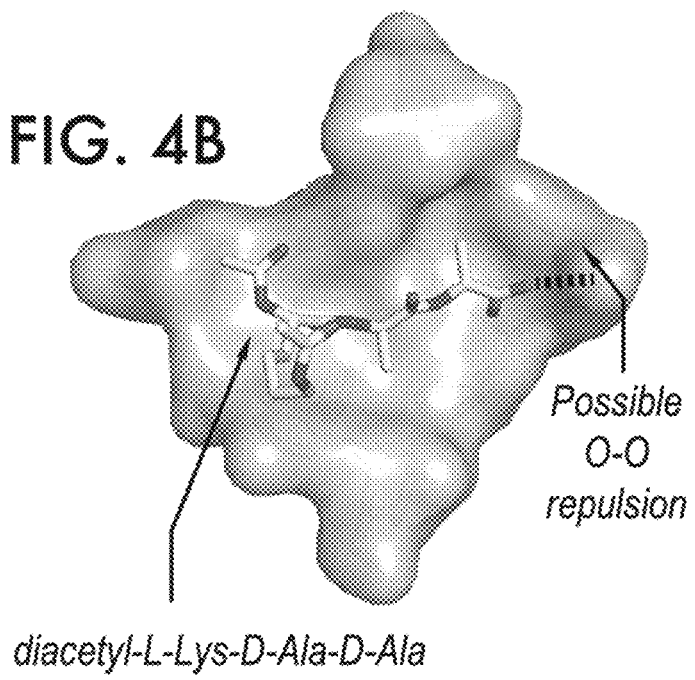

In order to evaluate the impact of sterics and the third hypothesis outlined above, the position of the formate and chloride and the overall structural congruence of vancomycin, keratinimicin A, and keratinicyclin B were used to generate a model of the tripeptide complex of keratinimicin A and keratinicyclin B. The resulting space-filling models (FIGS. 4A and 4B) highlight the importance of Cl-Hpg-7 (3-chloro-4-hydroxyphenylglycine-7) in creating a small rigid binding pocket that locks the tripeptide ligand in place. This steric lock is missing in keratinicyclin B, which may explain the different affinities of keratinimicin A and keratinicyclin B for the tripeptide. Moreover, as seen in FIG. 4B, the model shows a short distance (~3.6 Å) between the oxazolidinone carbonyl-oxygen and the terminal carboxyl group of the ligand, likely causing a repulsive interaction. This distance is similar to the O-O repulsion that render bacteria, which incorporate D-Ala-D-lactate, resistant to vancomycin. In the absence of simple experiments to test the importance of the steric effect, DFT-based calculations were utilized, in which it was sought to estimate the contribution toward binding energy provided by Cl-Hpg-7 in keratinimicin A.

DFT optimizations were performed at the B3LYP/6-31G** level, selected to more accurately describe H-bonding interactions. Frequency calculations provided thermochemical values and ensured an energetic minimum; use of the polarizable continuum model helped simulate the electrostatic effects of water. Using Avagadro, hydrogens were added to models of the tripeptide-complex of keratinimicin A and keratinicyclin B assuming neutral pH. The resultant complexes were then energy-minimized with the UFF forcefield to help with steric clashes brought on by the alignment procedure, before DFT optimization. The binding energy of desleucyl-1 was also computed, which does not appreciably bind the tripeptide ($K_d$~20 mM).

To create the complexes of keratinimicin A and keratinicyclin B bound to $Ac_2$-KAA-tripeptide, alignment of vancomycin bound to the tripeptide (PDB: 1FVM) with each GPA was performed, then the coordinates were saved after removal of vancomycin. Hydrogens were then added to the complexes in Avogadro assuming neutral pH. To develop the complex with desleucyl-1, the N-Me-Leu7 residue was replaced with a hydrogen atom, creating a terminal primary amine on the hexamer. The amide connected to the adjacent asparagine was then flipped in accordance with NMR structural analysis of the hexamer. These complexes were then preliminarily energy-minimized using the built in UFF forcefield, to remove any steric clashes brought on by the alignment procedure using the steepest descent algorithm. With these starting models, DFT structural optimization of each complex was performed using Gaussian 09[13] at the B3LYP/6-31G** level, with the inclusion of the polarizable continuum model (PCM) to simulate the electrostatic effects of water. Frequency calculations were also included to (1) obtain the zero-point correction (ZPC) to the electronic energy, which takes into account the fact that quantum systems exist one vibrational quantum above the absolute minimum of their respective potential energy curve, (2) obtain thermochemical values including enthalpies and Gibbs energies, and (3) ensure that all structures were energetic minima rather than transition states. It is important to emphasize these calculation results give relative energies, comparing on a first principles basis binding between each GPA and the tripeptide. These results sample a single potential energy minimum for each reactant and complex; the absolute values obtained, therefore, do not replicate experimental results.

Binding energies, enthalpies, and Gibbs free energies were computed for various GPA-ligand complexes. See Table 2, below.

TABLE 2

Calculated binding energies (kcal/mol) between the GPA indicated and the tripeptide ligand.[a]

| | Calculation | | | |
|---|---|---|---|---|
| GPA | $\Delta E$[b] | $\Delta E + ZPC$[c] | $\Delta H$ | $\Delta G$ |
| vancomycin | −43.5 | −40.8 | −41.4 | −21.7 |
| desleucyl-1 | −27.8 | −26.0 | −27.0 | −2.6 |
| keratinimicin A | −43.1 | −40.9 | −41.3 | −22.3 |
| keratinicyclin B | −36.6 | −33.5 | −34.3 | −12.5 |

| | Experiment | | | |
|---|---|---|---|---|
| GPA | $K_d$ (μM) | T$\Delta$S | $\Delta H$ | $\Delta G$ |
| vancomycin | 2.7 ± 0.4 | −0.96 | −8.6 ± 0.5 | −7.6 |
| desleucyl-1 | ~20,000 | — | — | — |
| keratinimicin A | 1.7 ± 0.3 | 0.85 | −7.0 ± 0.3 | −7.9 |
| keratinicyclin B | 2.8 ± 0.3 | 0.20 | −7.4 ± 0.3 | −7.6 |

[a]Chain A was used in all calculations.
[b]Electronic binding energies.
[c]Zero-point energy correction obtained using frequency calculations.

As is typical, the calculated $\Delta G$ values differ from those obtained experimentally, because only a single optimized conformer is sampled in calculations whereas many microstates are averaged in solution. However, with the adjustments described above (i.e., use of 6-31G**), these calculations accurately reflect the H-bonding interactions in a solvated environment in this first principles study. Computationally-derived binding energies for vancomycin and desleucyl-1 were consistent with reported experimental results with the latter effectively unable to bind the tripeptide. The calculated affinity of keratinicyclin B for the tripeptide ligand was 6.4 kcal/mol lower than that of keratinimicin A. Thus, despite the presence of the five H-bonding partners in suitable orientations, the calculations reinforce the inability of keratinicyclin B to bind the tripeptide. The 7mer backbones of vancomycin and keratinimicin A form a cup-shaped structure that engulfs the tripeptide. This topology is not formed in keratinicyclin B. O-O repulsion further contributes to the lack affinity for the tripeptide.

Previous bioactivity data with keratinicyclin B show that it inhibits *C. difficile* growth with a minimal inhibitory concentration (MIC) of 9.8 μM. In light of the results above, the bioactivity data suggest that keratinicyclin B interferes with an alternative target, rather than the peptidoglycan terminus, to inhibit growth.

A checkerboard analysis was performed in which the MIC of vancomycin, or keratinicyclin B, or a combination of vancomycin and keratinicyclin B was determined against *C. difficile* and a fractional inhibitory concentration index was computed.

Minimal inhibitory concentrations (MICs) were determined by the agar dilution method following the guidelines of the Clinical and Laboratory Standards Institute (CLSI). Vancomycin and keratinicyclin B stock solutions were serially diluted in a 24-well microtiter plate containing *Brucella* agar supplemented with 5% v/v defibrinated sheep blood, 5 μg/mL hemin, and 10 μg/mL vitamin K1 for a concentration range between 0.063 and 128m/mL. The effect of vancomycin in combination with keratinicyclin B against *C. difficile* P8 was assessed by the checkerboard agar dilution method. In this case, vancomycin and keratinicyclin B stock solutions were serially diluted along the ordinate and abscissa, respectively, from 2×MIC to 1/32×MIC. The antibiotic agar plates were prereduced in an anaerobic container prior to inoculation.

*C. difficile* P8 was grown anaerobically on prereduced Brucella agar plates supplemented with 5% v/v defibrinated sheep blood, 5 µg/mL hemin, and 10 µg/mL vitamin K1 at 37° C. for 48 h. To avoid the selection of an atypical variant, five colonies were suspended in prereduced Gifu anaerobic broth and grown to a density equivalent to a 0.5 McFarland standard (1-2×10$^8$ cfu/mL). Once the appropriate cell density was reached, the prereduced antibiotic agar plates were inoculated (10$^5$ cfu/spot).

After incubating anaerobically at 37° C. for 48 h, the plates were inspected for bacterial growth. The MIC was defined as the lowest concentration of antibiotic leading to no growth, one colony, or a fine haze. The fractional inhibitory concentration index (ΣFIC) was calculated according to the equation: $\Sigma FIC = FIC_{vancomycin} + FIC_{keratinicyclin\ B}$, where $FIC_{vancomycin}$ is the MIC of vancomycin in combination divided by the MIC of vancomycin alone and, respectively, $FIC_{keratinicyclin\ B}$ is the MIC of keratinicyclin B in combination divided by the MIC of keratinicyclin B alone. The combination effect was defined as synergistic when ΣFIC≤0.5, additive when 0.5<ΣFIC≤1, indifferent when 1<ΣFIC≤2, and antagonistic when ΣFIC>2.

With vancomycin alone, it was determined to have an MIC of 1 µg/mL, consistent with previous results. With keratinicyclin B alone, an MIC of 4 µg/mL was recorded. The combination of vancomycin and keratinicyclin clearly indicated a synergistic interaction at several concentrations

TABLE 3

Checkerboard Analysis Results. (G = cell growth, I = indifference, A = additive, S = synergistic)

| Keratinicyclin B (µg/mL) | 8 | I | I | I | I | I | I | I | I |
|---|---|---|---|---|---|---|---|---|---|
| | 4 | I | I | I | I | I | I | I | I |
| | 2 | G | G | G | A | A | A | I | I |
| | 1 | G | G | G | S | S | A | I | I |
| | 0.5 | G | G | G | G | S | A | I | I |
| | 0.25 | G | G | G | G | G | G | I | I |
| | 0.125 | G | G | G | G | G | G | I | I |
| | 0 | G | G | G | G | G | G | I | I |
| | | 0 | 0.31 | 0.63 | 0.125 | 0.25 | 0.5 | 1 | 2 |
| | | Vancomycin (µg/mL) | | | | | | | |

Most notably, mere titers of 0.25 µg/mL of vancomycin and 0.5 µg/mL of keratinicyclin B were sufficient to completely inhibit the growth of *C. difficile*. These results are consistent with the lack of D-Ala-D-Ala binding by keratinicyclin B and validate an alternative, possibly new molecular target, which may be used in the future to identify new *C. difficile* antibiotics.

In summary, it is found that keratinicyclin B is unable to bind the peptidoglycan terminus. Thermodynamic binding studies, crystallographic analysis, and DFT-based computations all suggest that the lack of binding is driven by steric and stereoelectronic constraints. This conclusion is consistent with prior work in which replacement of D-Ala with bulkier sidechains abolishes binding by vancomycin, and with the structures of class IV GPAs, such as teicoplanin, in which a fourth aromatic crosslink between residues 5 and 7 further rigidifies the hydrophobic binding pocket. The synergy data disclosed above supports the conclusion that keratinicyclin B interferes with an alternative target to inhibit *C. difficile* growth.

Keratinicyclin B was previously shown to display narrow-spectrum activity against *C. difficile*. To assess the specificity of the vancomycin-keratinicyclin B combination, a suite of gut bacteria was treated with each drug alone and drug combinations shown to synergistically inhibit *C. difficile* growth.

Figure 5:
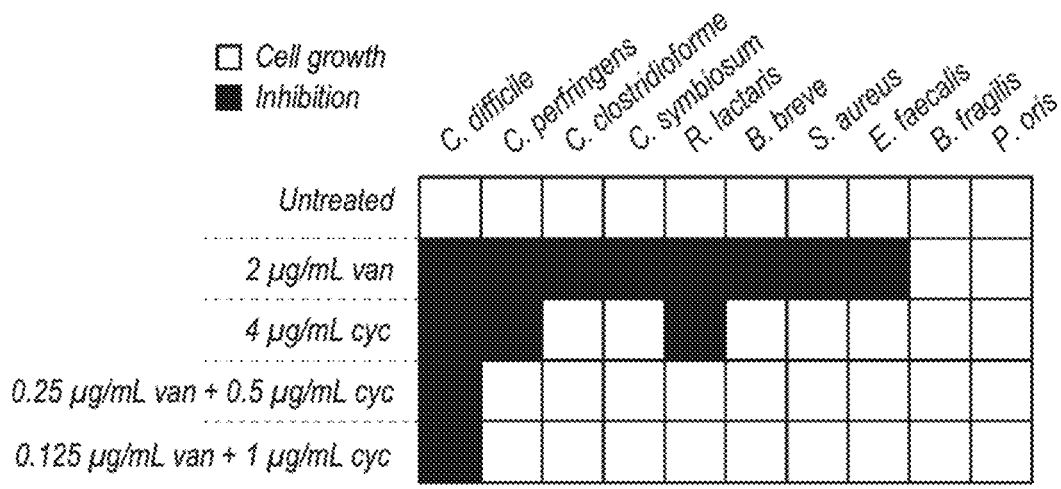
FIG. 5 is a chart indicating an antimicrobial susceptibility profile of selected gut bacteria to vancomycin ("van") and keratinicyclin B ("cyc").

Referring to FIG. 5, the following gut bacteria were treated with vancomycin ("van"), keratinicyclin B ("cyc"), and vancomycin-keratinicyclin B combinations: *Clostridium difficile*, Strain P8, *Clostridium perfringens*, Strain WAL-14572, *Clostridium symbiosum*, Strain WAL-14673, HM-319, *Clostridium clostridioforme*, Strain 2_1_49FAA, HM-306, *Bifidobacterium breve*, Strain HPH0326, HM-856, *Ruminococcus lactaris*, Strain CC59_002D, HM-1057, *Staphylococcus aureus*, strain Newman, *Enterococcus faecalis*, Strain OG1RF, *Bacteroides fragilis*, Strain HM-20, and *Prevotella oris*, Strain F0302, HM-93.

As expected, vancomycin displayed broad-spectrum antibacterial activity against all tested Gram-positive bacteria. Keratinicyclin B exhibited a narrower spectrum of antibiotic activity, inhibiting the growth of *C. difficile*, *Clostridium perfringens*, and *Ruminococcus lactaris*. Despite the inhibitory effect, keratinicyclin B did not interact synergistically with vancomycin against *C. perfringens*. Vancomycin-keratinicyclin B combinations solely inhibited the growth of *C. difficile*, sparing the remaining gut bacteria. Importantly, several of the tested gut bacteria have been associated with providing colonization resistance against *C. difficile*. Overall, these results indicate that combined treatment with vancomycin and keratinicyclin B can specifically inhibit *C. difficile* growth without impacting gut microbiota diversity.

Figure 6:
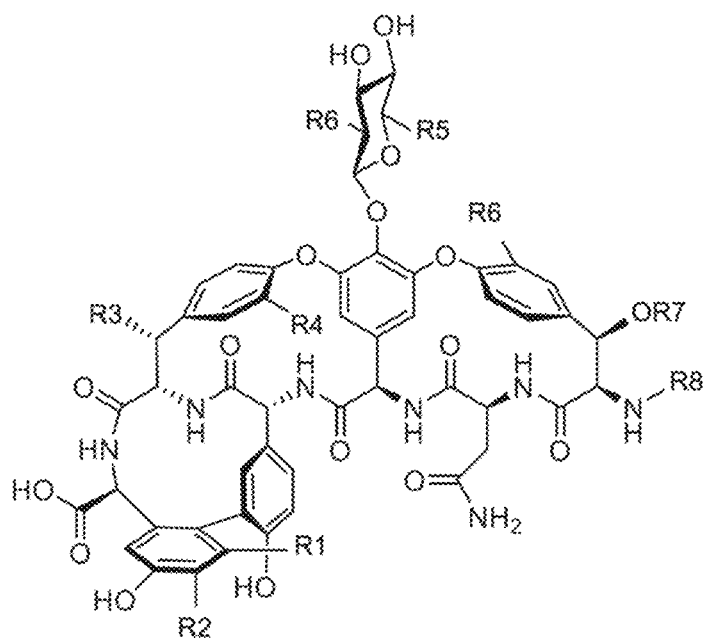
FIG. 6 is an image showing a core structure of vancomycin and related compounds.

Based on the above, it is expected that glycopeptide antibiotics that—like keratinicyclin B—have a similar core structure to vancomycin (see, e.g., FIG. 6, where R1-R8 may vary), but have R7 and R8 selected such that, combined, they form an oxazolidinone, can be utilized as an alternative to Keratinicyclin B to achieve the same effect. In some embodiments, R1-R8 may be, e.g., H; OH; a halogen such as Cl; a monosaccharide, disaccharide, or polysaccharide; a linear or branched alkane, alkene, or alkyne, that may have a length of 18 or fewer carbon atoms, and that may optionally be substituted with one or more 0, N, P, or S atoms; or a cycloalkane, cycloalkene, or cycloalkyne, that may optionally be substituted with one or more 0, N, P, or S atoms.

Based on the above, it is expected that glycopeptide antibiotics that have a similar core structure to vancomycin (see, e.g., FIG. 6, where R1-R8 may vary) but allow the molecule to bind the peptidoglycan, by, e.g., not having R7/R8 selected to form an oxazolidone, or otherwise position an oxygen atom in a similar position, can be combined with Keratinicyclin B to achieve the same effect as vancomycin. In some embodiments, R1-R8 may be, e.g., H; OH; a halogen such as Cl; a monosaccharide, disaccharide, or polysaccharide; a linear or branched alkane, alkene, or alkyne, that may have a length of 18 or fewer carbon atoms, and that may optionally be substituted with one or more 0, N, P, or S atoms; or a cycloalkane, cycloalkene, or cycloalkyne, that may optionally be substituted with one or more 0, N, P, or S atoms.

In some embodiments, the concentrations of each glycopeptide antibiotic may be between 1/2 and 1/20 of its respective minimal inhibitory concentration. In some embodiments, the concentrations of each glycopeptide antibiotic may be between 1/4 and 1/8 of its respective minimal inhibitory concentration.

In some embodiments, the concentration of each glycopeptide antibiotic may be between 150 nM and 350 nM. In some embodiments, the concentration of keratinicyclin B may be between 250 nM and 350 nM, and the concentration of a second glycopeptide antibiotic may be between 150 nM and 250 nM.

As described above, pharmaceutical compositions disclosed herein may include at least one pharmaceutically acceptable carrier. The at least one pharmaceutically acceptable carrier may be chosen from adjuvants and vehicles. The at least one pharmaceutically acceptable carrier, as used herein, includes any and all solvents, diluents, other liquid vehicles, dispersion aids, suspension aids, surface active agents, isotonic agents, thickening agents, emulsifying agents, preservatives, solid binders, and lubricants, as suited to the particular dosage form desired. Suitable carriers are well known to those skilled in the art and except insofar as any conventional carrier is incompatible with the compounds of this disclosure, such as by producing any undesirable biological effect or otherwise interacting in a deleterious manner with any other component(s) of the pharmaceutical composition, its use is contemplated to be within the scope of this disclosure. Non-limiting examples of suitable pharmaceutically acceptable carriers include, but are not limited to, ion exchangers, alumina, aluminum stearate, lecithin, serum proteins (such as human serum albumin), buffer substances (such as phosphates, glycine, sorbic acid, and potassium sorbate), partial glyceride mixtures of saturated vegetable fatty acids, water, salts, and electrolytes (such as protamine sulfate, disodium hydrogen phosphate, potassium hydrogen phosphate, sodium chloride, and zinc salts), colloidal silica, magnesium trisilicate, polyvinyl pyrrolidone, polyacrylates, waxes, polyethylene-polyoxypropylene-block polymers, wool fat, sugars (such as lactose, glucose and sucrose), starches (such as corn starch and potato starch), cellulose and its derivatives (such as sodium carboxymethyl cellulose, ethyl cellulose and cellulose acetate), powdered tragacanth, malt, gelatin, talc, excipients (such as cocoa butter and suppository waxes), oils (such as peanut oil, cottonseed oil, safflower oil, sesame oil, olive oil, corn oil and soybean oil), glycols (such as propylene glycol and polyethylene glycol), esters (such as ethyl oleate and ethyl laurate), agar, buffering agents (such as magnesium hydroxide and aluminum hydroxide), alginic acid, pyrogen-free water, isotonic saline, Ringer's solution, ethyl alcohol, phosphate buffer solutions, non-toxic compatible lubricants (such as sodium lauryl sulfate and magnesium stearate), coloring agents, releasing agents, coating agents, sweetening agents, flavoring agents, perfuming agents, preservatives, and antioxidants.

In some embodiments, such as when the composition is administered topically or intravenously, the pharmaceutical composition may be formulated as a liquid. n some embodiments, such as where the composition is administered orally, it may be formulated as a pill, capsule, tablet, etc.

In some embodiments, a method for treating or preventing a *C. difficile* infection may be provided.

The method may include administering a therapeutically effective dose of a plurality of glycopeptide antibiotics, including a first glycopeptide antibiotic and a second glycopeptide antibiotic. The first and second glycopeptide antibiotic may be provided in concentrations less than their respective minimal inhibitory concentrations.

The first glycopeptide antibiotic and second glycopeptide antibiotic are then allowed to specifically inhibit *C. difficile* in a synergistic manner.

The first glycopeptide antibiotic may selectively inhibits a plurality of *Clostridium* species including *C. difficile*, while the second glycopeptide antibiotic may be a broad-spectrum inhibitor of a plurality of species, including at least one species native to a human microbiome.

In some embodiments, the at least one species native to a human microbiome comprises at least one species native to a human gut microbiome, which may be a gram-positive bacterial species such as *E. faecalis*.

As disclosed herein, the first glycopeptide antibiotic may be, e.g., a keratinicyclin or derivative thereof, such as keratinicyclin B or a derivative thereof.

In some embodiments, the second glycopeptide antibiotic may be vancomycin, telavancin, dalbavancin, oritavancin, teicoplanin, a keratinicyclin different from keratinicyclin B, or a combination thereof.

In some embodiments, the concentrations of each glycopeptide antibiotic may be between 1/2 and 1/20 of its respective minimal inhibitory concentration. In some embodiments, the concentrations of each glycopeptide antibiotic may be between 1/4 and 1/8 of its respective minimal inhibitory concentration.

In some embodiments, the therapeutically effective dose of the plurality of glycopeptide antibiotics may be administered orally.

Those skilled in the art will recognize or be able to ascertain using no more than routine experimentation many equivalents to the specific embodiments of the invention described herein. Such equivalents are intended to be encompassed by the following claims.

What is claimed:

1. A pharmaceutical composition for treating an infection caused by *C. difficile*, the pharmaceutical composition comprising:
    a plurality of glycopeptide antibiotics consisting of keratinicyclin B and a second glycopeptide antibiotic, the second glycopeptide antibiotic consisting of vancomycin; and
    a pharmaceutically acceptable carrier;
    wherein each of the plurality of glycopeptide antibiotics is present in a synergistic concentration less than its respective minimal inhibitory concentration of *C. difficile*.

2. The pharmaceutical composition according to claim 1, wherein the concentration of each glycopeptide antibiotic is between 1/2 and 1/20 of its respective minimal inhibitory concentration.

3. The pharmaceutical composition according to claim 2, wherein the concentration of each glycopeptide antibiotic is between 1/4 and 1/8 of its respective minimal inhibitory concentration.

4. The pharmaceutical composition according to claim 1, wherein the concentration of each glycopeptide antibiotic is between 150 nM and 350 nM.

5. The pharmaceutical composition according to claim 4, wherein the concentration of keratinicyclin B is between 250 nM and 350 nM, and the concentration of a second glycopeptide antibiotic of the plurality of glycopeptide antibiotics is between 150 nM and 250 nM.

6. A method for treating a *C. difficile* infection, comprising:
    administering a therapeutically effective dose of a first glycopeptide antibiotic consisting of keratinicyclin B and a second glycopeptide antibiotic consisting of vancomycin, the first and second glycopeptide antibiotic being present in concentrations less than their respective minimal inhibitory concentrations; and allowing the first glycopeptide antibiotic and second glycopeptide antibiotic to specifically inhibit *C. difficile* in a synergistic manner.

7. The method according to claim 6, wherein the concentrations of each glycopeptide antibiotic is between 1/4 and 1/8 of its respective minimal inhibitory concentration.

8. The method according to claim 6, wherein the therapeutically effective dose of the plurality of glycopeptide antibiotics is administered orally.

\* \* \* \* \*